United States Patent
Vijayasankar et al.

(10) Patent No.: US 9,819,393 B2
(45) Date of Patent: *Nov. 14, 2017

(54) JOINING PROCESS IN A POWERLINE COMMUNICATION (PLC) NETWORK

(71) Applicant: Texas Instruments Incorporated, Dallas, TX (US)

(72) Inventors: Kumaran Vijayasankar, Allen, TX (US); Ramanuja Vedantham, Allen, TX (US); Robert Liang, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,534

(22) Filed: Mar. 7, 2017

(65) Prior Publication Data
US 2017/0180004 A1    Jun. 22, 2017

Related U.S. Application Data

(63) Continuation of application No. 15/013,062, filed on Feb. 2, 2016, now Pat. No. 9,615,315, which is a (Continued)

(51) Int. Cl.
*H04B 3/54* (2006.01)
*H04W 48/10* (2009.01)
*H04L 29/08* (2006.01)

(52) U.S. Cl.
CPC ........... *H04B 3/542* (2013.01); *H04L 69/324* (2013.01); *H04W 48/10* (2013.01)

(58) Field of Classification Search
CPC ....... H04L 69/324; H04W 48/10; H04B 3/542
See application file for complete search history.

(56) References Cited

U.S. PATENT DOCUMENTS 7,795,877 B2 *  9/2010  Radtke ............. G01R 19/16547
                                                      324/530
7,868,621 B2 *  1/2011  Liu ....................... G01R 31/008
                                                      324/512

(Continued)

OTHER PUBLICATIONS

Liu et al., "Broadband PLC access systems and field deployment in European power line networks", May 2003, IEEE Communications Magazine, vol. 41, No. 5, pp. 114-118.*

(Continued)

*Primary Examiner* — Kenneth Chang
(74) *Attorney, Agent, or Firm* — Kenneth Liu; Charles A. Brill; Frank D. Cimino

(57) ABSTRACT

In a disclosed embodiment, a power line communication (PLC) device sends an active channel scan request from a host layer to an adaptation layer. In response to the adaptation layer receiving the request, a MAC layer is instructed to broadcast a beacon request frame. The PLC device receives from each of one or more neighboring devices that respond to the beacon request frame a beacon frame including an address and a personal area network (PAN) identifier. A listing of PAN identifiers indicated by the beacon frames is provided to the host layer. The host layer selects a target network corresponding to a selected PAN identifier and selects one of the one or more neighboring devices associated with the selected PAN identifier as a target bootstrapping agent. The host layer instructs the adaptation layer to join the target network using the target bootstrapping agent.

20 Claims, 6 Drawing Sheets

Related U.S. Application Data continuation of application No. 14/825,245, filed on Aug. 13, 2015, now Pat. No. 9,282,504, which is a continuation of application No. 13/655,414, filed on Oct. 18, 2012, now Pat. No. 9,143,197.

(60) Provisional application No. 61/548,310, filed on Oct. 18, 2011.

(56) References Cited

U.S. PATENT DOCUMENTS

| | | | |
|---|---|---|---|
| 7,917,663 | B2 | 3/2011 | Choi et al. |
| 8,520,696 | B1 | 8/2013 | Corral et al. |
| 2004/0075535 | A1 | 4/2004 | Propp et al. |
| 2005/0169056 | A1 | 8/2005 | Berkman et al. |
| 2005/0185595 | A1 | 8/2005 | Lee |
| 2006/0152344 | A1 | 7/2006 | Mowery, Jr. |
| 2006/0193315 | A1* | 8/2006 | Sinivaara ............ H04W 48/10 370/389 |
| 2007/0174382 | A1 | 7/2007 | Chung et al. |
| 2007/0198748 | A1 | 8/2007 | Ametsitsi et al. |
| 2008/0143491 | A1 | 6/2008 | Deaver |
| 2009/0073983 | A1 | 3/2009 | Kim |
| 2009/0103731 | A1 | 4/2009 | Sarikaya |
| 2009/0125351 | A1 | 5/2009 | Davis, Jr. et al. |
| 2010/0034159 | A1* | 2/2010 | Shin ............... H04W 72/1257 370/329 |
| 2010/0085922 | A1* | 4/2010 | Dhanapal ............ H04W 28/065 370/329 |
| 2010/0138552 | A1 | 6/2010 | Oh et al. |
| 2010/0158494 | A1 | 6/2010 | King |
| 2010/0306533 | A1* | 12/2010 | Phatak .................. G06F 21/34 713/156 |
| 2011/0029776 | A1* | 2/2011 | Xiao .................... H04W 12/04 713/171 |
| 2012/0063427 | A1 | 3/2012 | Kandekar et al. |

OTHER PUBLICATIONS

Xiao Hui et al., Medium-voltage Power Line Carrier Communication System, Nov. 2004, International Conference on Power System Technology, vol. 2, pp. 14536-1539.

Gonzalez et al., Performance analysis of hybrid broadband access technologies using PLC and Wi-Fi, Jun. 2005, International Conference on Wireless Networks, Communications and Mobile Computing, vol. 1, pp. 564-569.

* cited by examiner

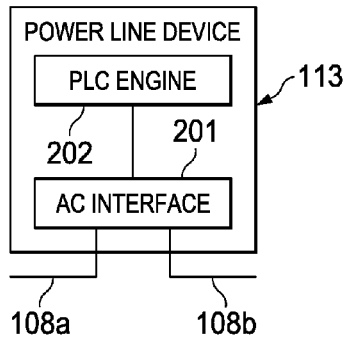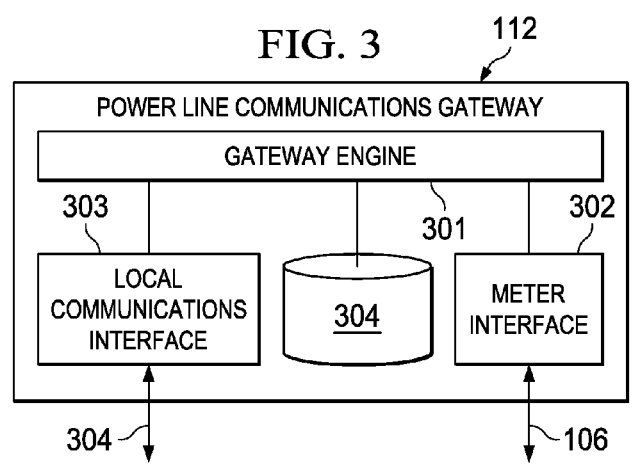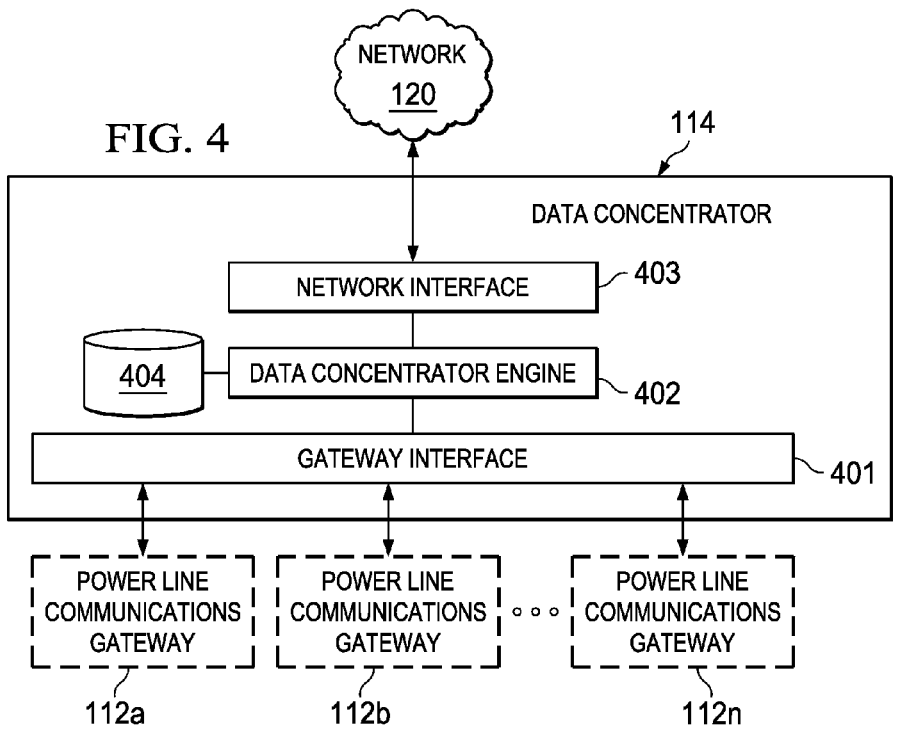

JOINING PROCESS IN A POWERLINE COMMUNICATION (PLC) NETWORK

CROSS-REFERENCE TO RELATED APPLICATION(S)

This application is a continuation of and claims benefit to U.S. patent application Ser. No. 15/013,062 filed Feb. 2, 2016, and now U.S. Pat. No. 9,615,315, which is a continuation of and claims benefit to U.S. patent application Ser. No. 14/825,245 filed Aug. 13, 2015, and now issued U.S. Pat. No. 9,282,504, which is a continuation of and claims benefit to U.S. patent application Ser. No. 13/655,414 filed Oct. 18, 2012, and now issued U.S. Pat. No. 9,143,197, which claims the benefit of the filing date of U.S. Provisional Patent Application No. 61/548,310, entitled "G3 Networks Joining Process" and filed on Oct. 18, 2011, the disclosures of which is hereby incorporated by reference herein in its entireties.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Communications on PLC systems may use Orthogonal Frequency-Division Multiplexing (OFDM) signals that comply with a PRIME (Powerline Related Intelligent Metering Evolution), G3, IEEE P1901.2 or other Power Line Communication (PLC) standard, for example. The communication signal may be Frequency Shift Keying (FSK) or Phase Shift Keying (PSK) signals depending on the transmission method. Power line communication systems based on narrowband OFDM (NB-OFDM) are being developed for smart grid technologies. European utilities, such as Iberdrola and Electricité Réseau Distribution France (ERDF), are pioneering the deployment of NB-OFDM PLC systems for advanced metering, such as PRIME and G3, respectively.

SUMMARY

Systems and methods for implementing a join process for a G3 protocol in power line communications (PLC) are described. In an illustrative embodiment, a method performed by a PLC device, such as a PLC meter, may include identifying at least one bootstrapping agent and a personal area network (PAN) identifier for one or more networks that are operating within a personal operating space of the PLC device. The device identifies a target network to join. The target network is associated with a target PAN identifier. The device selects a target bootstrapping agent to use for the join process with the target network. The target bootstrapping agent may be selected from a list of bootstrapping agents associated with the target PAN identifier. The device then attempts to join the target network using the target bootstrapping agent.

If the attempt to join the target network fails, then the device determines a failure reason. If the failure reason was an authentication failure, then the device reports the authentication failure. If the attempt to join the target network fails, then the device further determines if other bootstrapping agents are associated with the target PAN identifier. The device selects an alternate target bootstrapping agent from the other bootstrapping agents that are associated with the target PAN identifier. The device attempts to join the target network using the alternate target bootstrapping agent. In one embodiment, the device reattempts to join the target network using the alternate target bootstrapping agent only if the reason for reason for failure to join is not an authentication failure.

If the attempt to join the target network using the alternate target bootstrapping agent fails, then the device may select a second alternate target bootstrapping agent from the other bootstrapping agents that are associated with the target PAN identifier. The device may then attempt to join the target network using the second alternate target bootstrapping agent.

The target bootstrapping agent may be selected based upon a highest link quality indicator value. Alternatively, the target bootstrapping agent may be selected based upon a parameter in an adaptation sublayer management entity ADPM-Join.Request primitive.

In one embodiment, if the device identifies a PLC data concentrator among the at least one bootstrapping agents, then the data concentrator is selected as the target bootstrapping agent. The bootstrapping agents may be a 6LoWPAN bootstrapping server (LBS).

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
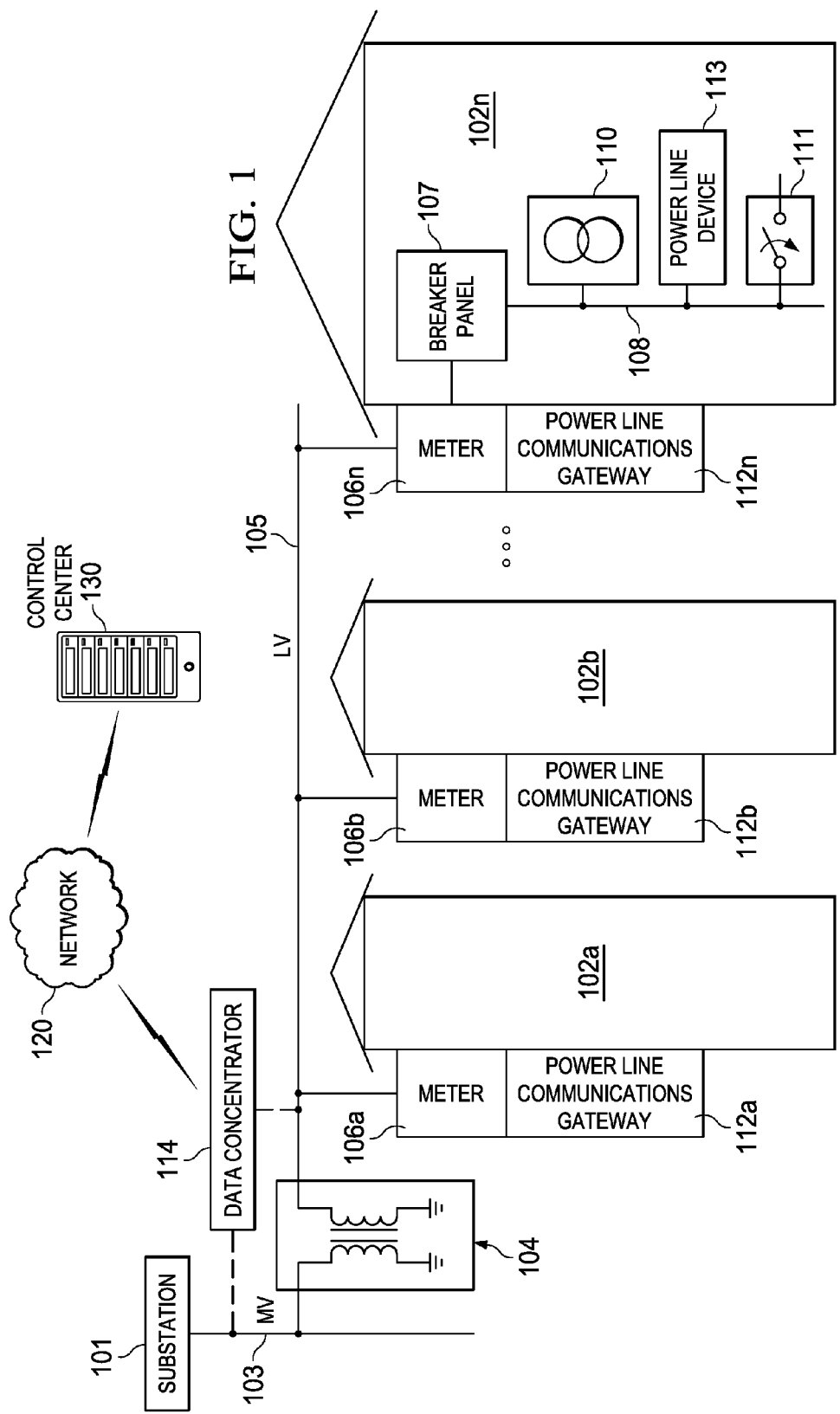

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
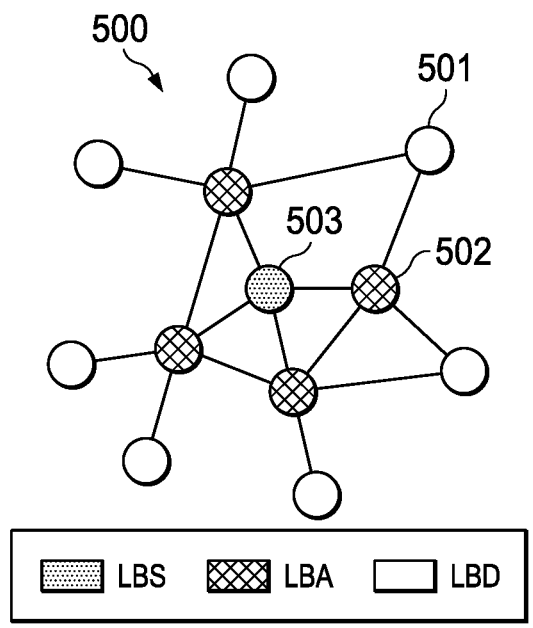

FIG. 5 is a diagram of a PLC mesh network according to some embodiments.

Figure 6:
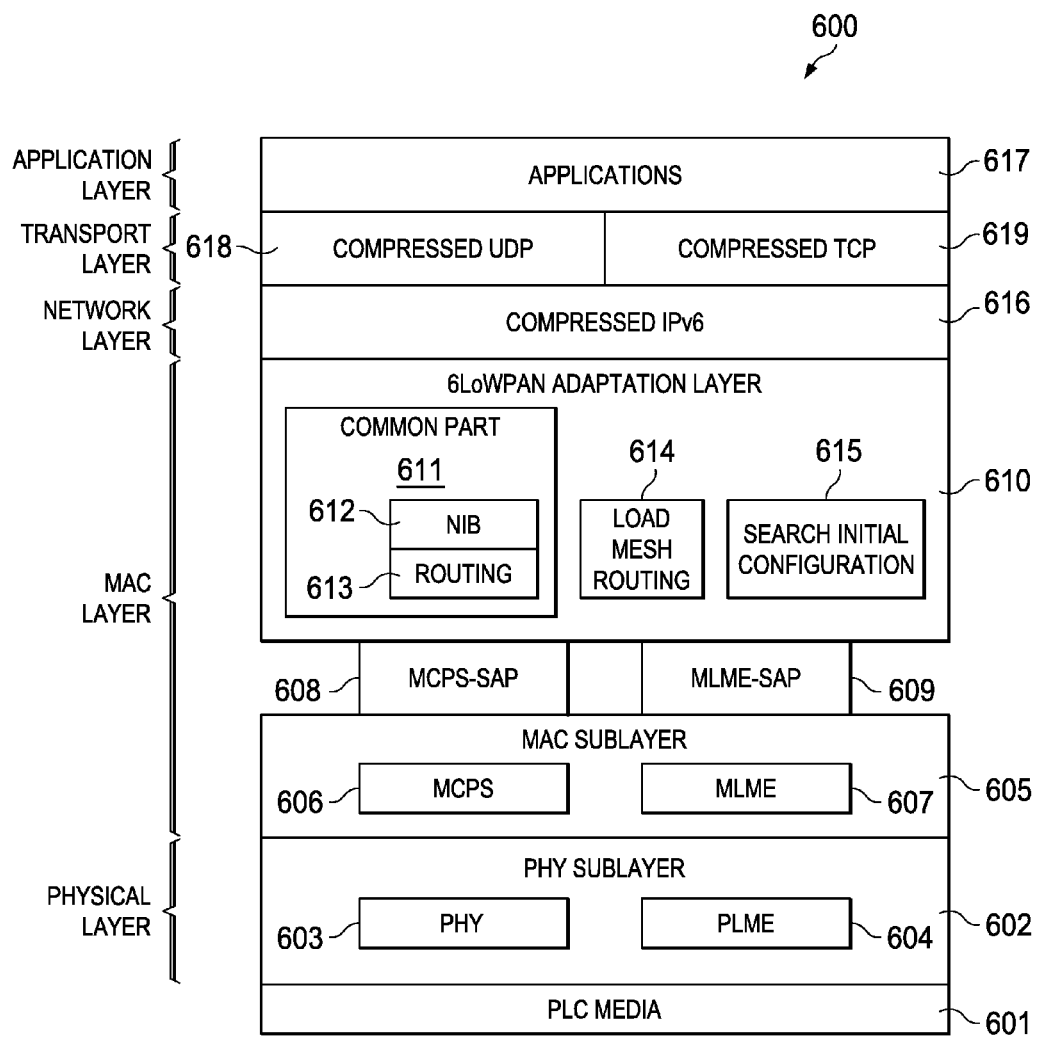

FIG. 6 illustrates a reference model according to an example embodiment used in the G3 specification.

Figure 7:
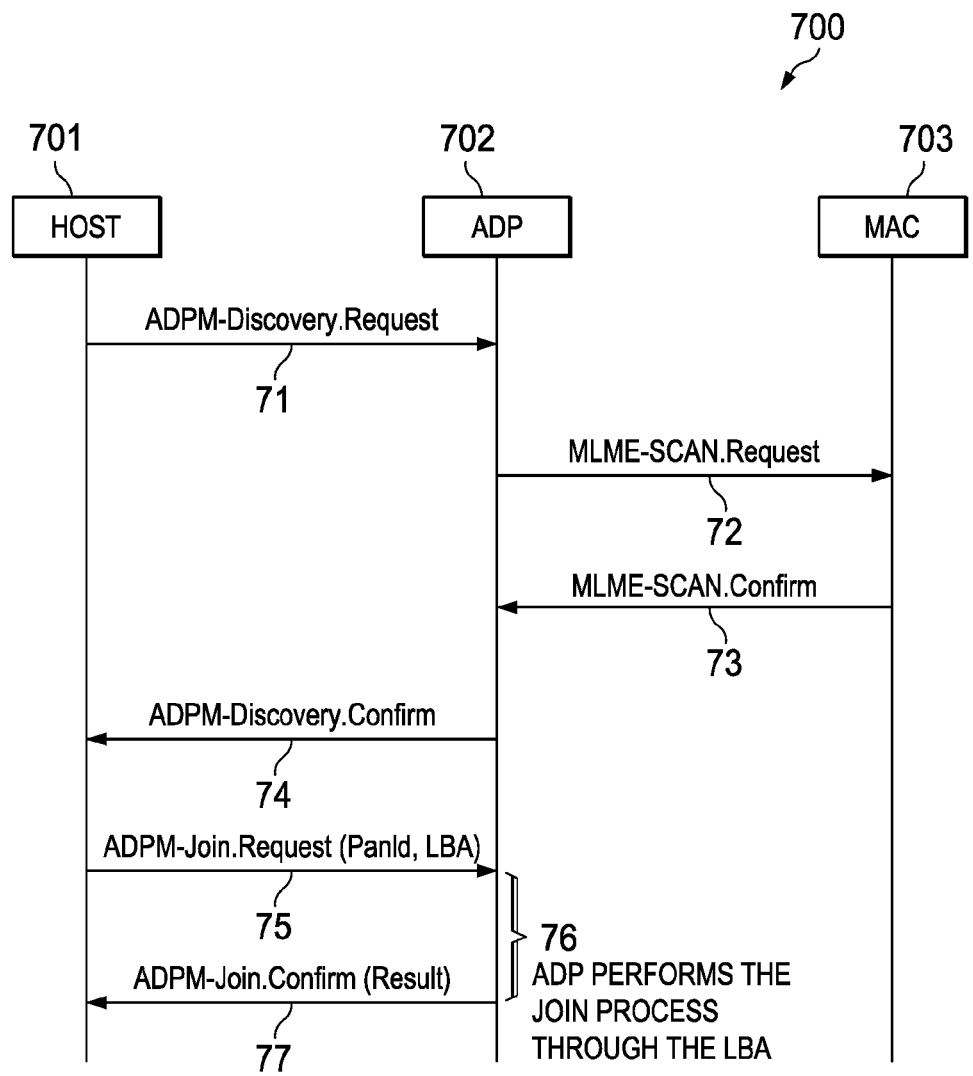

FIG. 7 illustrates a message flow for a join process according to one embodiment using the G3 specification.

Figure 8:
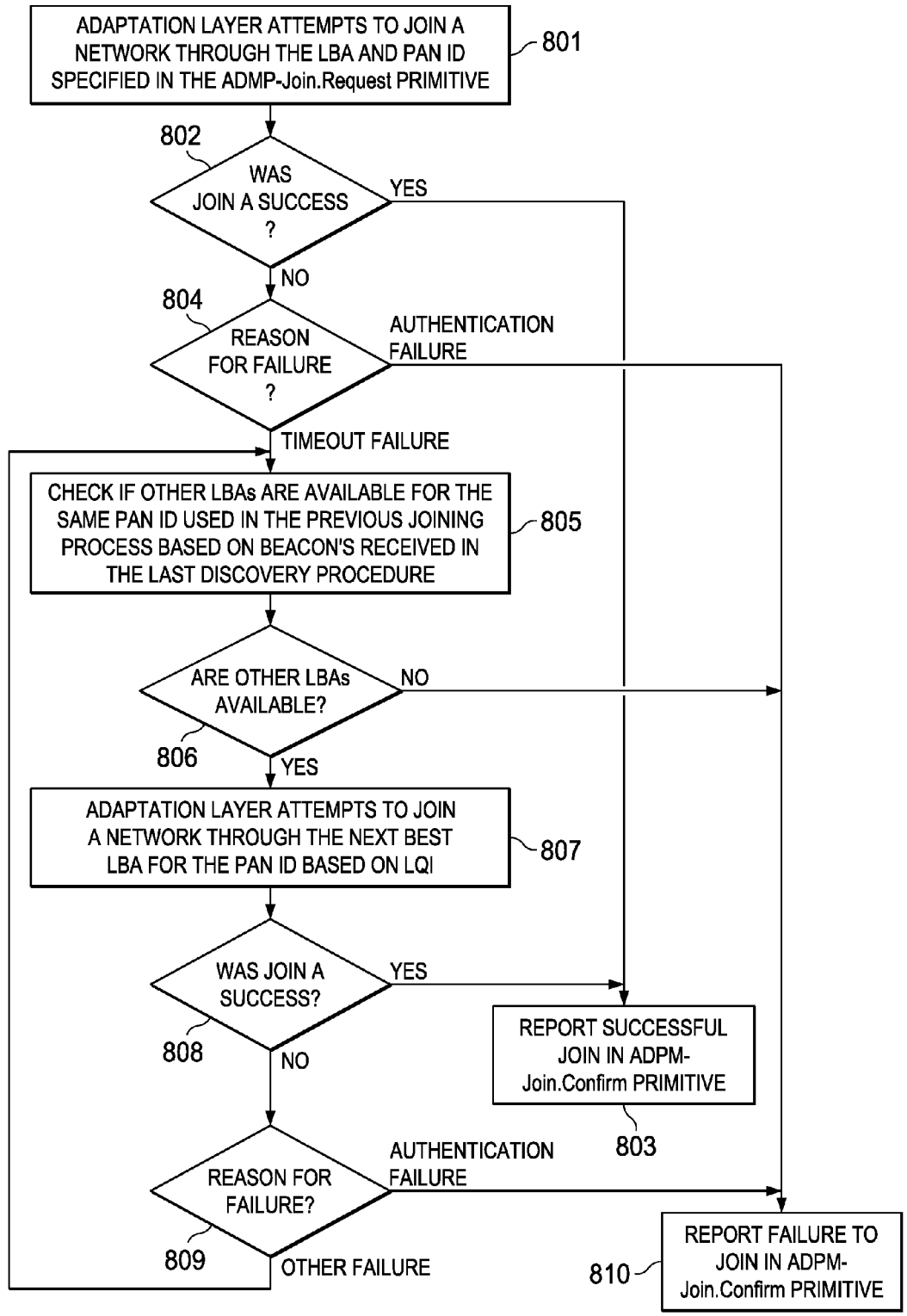

FIG. 8 is a flowchart illustrating a join process that is used by the adaptation layer in one embodiment.

Figure 9:
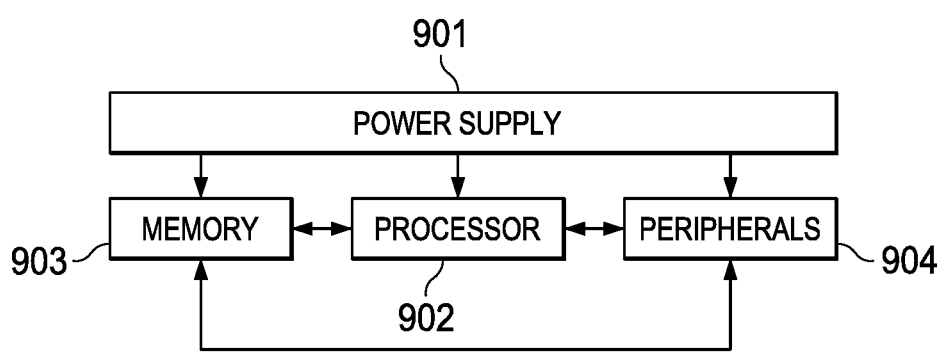

FIG. 9 is a block diagram of an integrated circuit according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Turning to FIG. 1, a power line communication (PLC) system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway (s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102$n$ and serve as a gateway to all PLC communications to and/or from premises 102$n$. In other embodiments, however, PLC gateway 112 may be absent and PLC devices 113 (as well as meter 106$n$ and/or other appliances) may communicate directly with PLC data concentrator 114. When PLC gateway 112 is present, it may include database 304 with records of frequency bands currently used, for example, by various PLC devices 113 within premises 102$n$. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112$a$-$n$. Network interface 403 is also coupled to data concentrator engine 402 and may be configured to communicate with network 120. In operation, data concentrator engine 402 may be used to collect information and data from multiple gateways 112$a$-$n$ before forwarding the data to control center 130. In cases where PLC gateways 112$a$-$n$ are absent, gateway interface 401 may be replaced with a meter and/or device interface (now shown) configured to communicate directly with meters 116$a$-$n$, PLC devices 113, and/or other appliances. Further, if PLC gateways 112$a$-$n$ are absent, frequency usage database 404 may be configured to store records similar to those described above with respect to database 304.

FIG. 5 is a diagram of a PLC mesh network 500 according to some embodiments. For ease of explanation, network 500 is described below as an IPv6 over Low power Wireless Personal Area Network (6LoWPAN) using the terminology employed in the Internet Engineering Task Force's (IETF) RFC 4944 specification. It should be understood, however, that other types of networks may be used in other alternative embodiments.

As illustrated, several full-function devices (FFDs) may be deployed within network 500, including LoWPAN BootStrapping Devices (LBDs), LoWPAN BootStrapping Agents (LBAs), and a LoWPAN BootStrapping Server (LBS). An LBD such as, for example, new PLC device 501, may be assumed to have little or no information about network 500 prior to joining the network. An LBA such as, for example, PLC device 502, is an FFD that has already joined in network 500, and therefore is one of its members. PLC device 502 is also a neighbor of a new PLC device 501, and thus it may be configured to aid in new PLC device 501's bootstrapping process by receiving protocol messages from PLC device 501 and forwarding them to an LBS, such as, for example, PLC data concentrator or router 503.

The maximum number of LBAs to be attempted can be controlled by the host by setting a PAN Information Base (PIB) attribute called adpMaxLBAs. In some embodiments this parameter can also be controlled by a parameter in the ADPM-Join.Request primitive.

FIG. 6 illustrates a reference model 600 according to an example embodiment used in the G3 specification to support an Orthogonal Frequency Division Multiplexing-Power Line Carrier (OFDM PLC) communication profile. PLC media 601 represents MV or LV power lines that carry the PLC signals between nodes in a PLC network. Physical (PHY) layer 602 provides an interface to PLC media 601. PHY layer 602 comprises two functional blocks: a PHY processing block 603 and a PHY Management Entity (PLME) 604. The PHY processing block 603 generates PHY protocol data units (PDUs), such as PHY data frames and PHY check frames, and performs scrambling, interleaving, error correction, and modulation functions for transmission of the PHY PDUs on the PLC media. PLME 604 provides carrier detection in support of a Carrier Sense Multiple Access with Collision Avoidance (CSMA/CA) access method. PLME 604 also provides phase detection to identify the power line phase on which a node transmits.

MAC sublayer 605 provides an interface to PHY layer 602. MAC sublayer 605 has two functional blocks: MAC Common Part Sublayer (MCPS) 606, which is responsible for communication with neighboring nodes, and MAC Layer Management Entity (MLME) 607, which manages the MAC sublayer. The MCPS block 606 is responsible for generating MAC PDUs, such as MAC data frames, MAC check frames, and beacon frames. MCPS block 606 also supports Personal Area Network (PAN) selection and addressing of the node. The MAC layer 605 uses two types of MAC addresses to designate an equipment item: a unique EUI-48 address (long address) assigned during manufacture of the equipment by adding two 0xFF bytes in its center, and a sixteen-bit address (short address) that is assigned dynamically and in a centralized manner by the 6LoWPAN Bootstrap Protocol (LBP).

The MCPS services are provided to the higher layer through a services access point (MCPS-SAP) 608 using MCPS services primitives, such as MCPS-DATA.request/indication/confirmation. These primitives allow the MAC layer to transmit a 6LoWPAN frame and provide MAC and PAN address information and the security parameters.

The MLME 607 is responsible for management of the MAC sublayer and relies in particular on the MAC PAN Information Base (MAC PIB). The MAC PIB comprises a neighbor table that contains all the information that the MAC and PHY levels need for bidirectional communication with neighboring nodes. The MLME 607 provides active discovery (active scan) of neighboring nodes, management of the MAC level parameters, and initialization/reinitialization of the MAC and PHY layers. Active scan is activated when a node starts or after the node has been detached from the network. The node sends a MAC discovery frame (active scan), to which all the active neighboring nodes reply by emitting a Beacon frame. The node collates the replies (MAC address, PAN number, signal quality, etc.) and classifies them in order of interest. The LBP is implemented at the 6LoWPAN level 610 to join networks.

MLME management services are provided to higher layers via MLME management primitives through a Services Access Point (MLME-SAP) 609. The MLME-START.request/confirm primitives initialize the MAC and PHY layers. The MLME-RESET.request/confirm primitives reinitialize the MAC and PHY layers. The MLME-SCAN- .request/confirm primitives activate sending of the MAC discovery frame, gathering of the information carried by the Beacon frames and, after a programmable time period, the sending of a list of neighbors with their main characteristics. The MLME-SET.request/confirm primitives enable information to be set in the MAC PIB. The MLME-GET.request/confirm primitives serve to retrieve information from the PHY PIB.

6LoWPAN adaptation sublayer 610 comprises three functional blocks. The common processing operations block 611 is responsible for end-to-end communication within the PLC Local Network (PLC LAN). The common processing operations block 611 generates the 6LoWPAN PDUs and provides reliable end-to-end data transfer and relaying of MAC frames. The 6LoWPAN information base (NIB) 612 comprises a routing table 613 that contains the identifier of the neighbor node to which a packet is to be routed. Each destination node is identified by its short address. The mesh routing function 614 constitutes the routing table using the LOAD protocol, which is a compact version of the Ad hoc On-Demand Distance Vector (AODV) protocol that is adapted to 6LoWPAN. The security and initial configuration function 615 uses the 6LoWPAN Bootstrap Protocol (LBP), which enables a node to acquire its short MAC address on 16 bits, along with the parameters it needs in order to communicate effectively.

The 6LoWPAN adaptation layer 610 communicates with higher level applications on application layer 616 through compressed IPv6 on network layer 617 and compressed UDP 618 or compressed TCP 619 on the transport layer.

FIG. 7 illustrates a message flow 700 for a join process according to one embodiment using the G3 specification. A host layer 701 communicates with an adaptation (ADP) layer 702, such as a 6LoWPAN adaptation layer. The ADP layer 702 communicates with a MAC layer 703. The host layer 701 uses an ADPM-Discovery.Request primitive 71 to request the ADP 702 to perform a scan and provide the host 701 with the list of PAN identifiers (PAN ID) and a corresponding LBA of the networks that are currently operating in the personal operating space (POS).

At the beginning of the bootstrapping procedure, an end device, such as a LoWPAN Bootstrapping Device or LBD, launches an active channel scan by invoking the ADPM-Discovery.Request primitive 71. The adaptation layer 702 then invokes the MLME-SCAN.Request primitive 72 of the MAC layer 703. The LBD sends a 1-hop broadcast Beacon-.request frame and any Full Feature Device (FFD) in the neighborhood should reply by sending a Beacon frame with its PAN identifier, short address and capabilities.

Upon completion, the MAC layer 703 issues an MLAIE-SCAN.confirm primitive 73, with the list of existing PANs in a PANDescriptorList parameter. In response, the adaptation layer 702 generates an ADPM-Discovery.Confirm primitive 74 that contains the PANDescriptorList parameter provided by the MAC layer 703.

At the end of the scan, the LBD selects one of the Beacon senders, which may be either a PAN coordinator that plays the role of LoWPAN Bootstrapping Server (LBS) or another FFD. In the latter case, the FFD (i.e., a LoWPAN Bootstrapping Agent or LBA) is in charge of relaying the LoWPAN Bootstrapping Protocol (LBP) frames between the LBA and the LBS.

The host layer 701 then uses the ADPM-Join.Request primitive 75 to request the adaptation layer 702 to perform a joining process. In the ADPM-Join.Request primitive 75, the host 701 specifies which node is to be used as a LBA for performing the joining process. The adaptation layer 702 then performs the join process 76 through the LBA. The adaptation layer 702 then uses the ADPM-Join.Confirm primitive 77 to let the host 701 know whether the joining process was a success or failure. If the joining resulted in a failure, then the host will repeat the discovery and join processes.

However, repeating the discovery and join processes again may result in the following drawbacks. The adaptation layer 702 may return the same LBA again to the host 701, which would cause the node to try to join through the same LBA through which the earlier joining process failed. The failure may have occurred, for example, because the link through the LBA was weak, so the same LBA is not desired. Also, because the Discovery primitive is used each time the joining process fails, repeating the discovery process will cause the network joining to be further delayed.

FIG. 8 is a flowchart illustrating a join process 76 (FIG. 7) that is used by the adaptation layer in one embodiment. In step 801, the adaptation layer attempts to join a network using the LBA and the PAN ID that are specified in the ADPM-Join.Request primitive 75. The success of the join process is evaluated in step 802. If the join process is successful, then the adaptation layer reports a successful join in the ADPM-Join.Confirm primitive 77 at step 803. If the join process fails, then the reason for failure is determined in step 804. If the reason for failure was due to an authentication failure, then the adaptation layer reports the failure immediately to the host layer using the ADPM-Join.Confirm primitive 77 in step 805.

If the join process failed due to a timeout, then the adaptation layer will not report a failure to the host layer. Instead, in step 805, the adaptation layer checks if any other LBA's are available for the same PAN ID that has been used for the joining process based on the beacons received during the last discovery procedure. If no other LBAs are available in step 806, then the process moves to step 805, and the adaptation layer reports the failure immediately to the host layer using the ADPM-Join.Confirm primitive 77. If other LBAs are available in step 806, then the process will attempt to join the network using the next best LBA in step 807. The next best LBA may be selected based on a link quality indicator (LQI), for example.

The success of the join process is evaluated again in step 808. If the join process was successful, then the adaptation layer reports a successful join in the ADPM-Join.Confirm primitive 77 at step 803. If the join process fails, then the reason for failure is determined in step 809. If the reason for failure was due to an authentication failure, then the adaptation layer reports the failure immediately to the host layer using the ADPM-Join. Confirm primitive 77 in step 805. If the join process failed due to a reason other than authentication failure, such as due to timeout, then the process returns to step 805 to determine if other LBAs are available and, if so, the process continues as described above.

In some embodiments, the Adaptation layer can specify all the LBAs to the host, and the host can in turn specify the list of LBAs to be tried in the ADPM-Join.Request primitive.

In an alternative embodiment, the adaptation layer ignores the LBA field in the ADPM-Join.Request primitive and instead begins with step 805 to select LBA. The adaptation then attempts to join a network using LBAs selected based upon other criteria.

In some embodiments, the LBA may be selected based upon availability of the data concentrator. If the data concentrator is available, then it will be chosen first for the join process. If the data concentrator is not available, then the LBA with the highest Link Quality Indicator (LQI) value will be chosen as the LBA.

In some other embodiments, during the initial discover procedure, the LBA will be chosen based upon the availability of the data concentrator. The, for the choice of the LBA if the initial joining process failed, if the received LQI is below a threshold (LQI_Threshold) then the LBA will not be even be attempted for the joining process. Instead, an LBA will be selected from among the remaining LBAs, and the LBA with the highest LQI value will be chosen as the LBA.

FIG. 9 is a block diagram of a circuit for implementing a discovery and join process according to some embodiments. In some cases, one or more of the devices and/or apparatuses shown in FIGS. 1-4 may be implemented as shown in FIG. 9. In some embodiments, processor 902 may be a digital signal processor (DSP), an application specific integrated circuit (ASIC), a system-on-chip (SoC) circuit, a field-programmable gate array (FPGA), a microprocessor, a microcontroller, or the like. Processor 902 is coupled to one or more peripherals 904 and external memory 903. In some cases, external memory 903 may be used to store and/or maintain databases 304 and/or 404 shown in FIGS. 3 and 4. Further, processor 902 may include a driver for communicating signals to external memory 903 and another driver for communicating signals to peripherals 904. Power supply 901 provides supply voltages to processor 02 as well as one or more supply voltages to memory 903 and/or peripherals 904. In some embodiments, more than one instance of processor 902 may be included (and more than one external memory 903 may be included as well).

Peripherals 904 may include any desired circuitry, depending on the type of PLC system. For example, in an embodiment, peripherals 904 may implement local communication interface 303 and include devices for various types of wireless communication, such as WI-FI, ZIGBEE, BLUETOOTH, cellular, global positioning system, etc. Peripherals 904 may also include additional storage, including RAM storage, solid-state storage, or disk storage. In some cases, peripherals 904 may include user interface devices such as a display screen, including touch display screens or multi-touch display screens, keyboard or other input devices, microphones, speakers, etc.

External memory 903 may include any type of memory. For example, external memory 903 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 903 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

What is claimed is:

1. A method comprising:
sending an active channel scan request from a host layer of a power line communication (PLC) device to an adaptation layer of the PLC device;
in response to the adaptation layer receiving the active channel scan request, using the adaptation layer to instruct a media access control (MAC) layer of the PLC device to broadcast a beacon request frame using a transmitter of the PLC device;
using a receiver of the PLC device to receive, from each of one or more neighboring devices that respond to the beacon request frame, a beacon frame including an address and a personal area network (PAN) identifier;
sending, from the MAC layer to the adaptation layer, a listing of PAN identifiers indicated by the beacon frames received from the one or more neighboring devices;
providing the listing of PAN identifiers from the adaptation layer to the host layer;
using the host layer to select a target network corresponding to a selected PAN identifier and to select one of the one or more neighboring devices associated with the selected PAN identifier as a target bootstrapping agent; and
using the host layer to instruct the adaptation layer to join the target network using the target bootstrapping agent.

2. The method of claim 1, wherein the adaptation layer is a 6LoWPAN adaptation layer.

3. The method of claim 1, wherein the beacon request frame is broadcasted by the receiver as a one-hop broadcast.

4. The method of claim 1, wherein the MAC layer comprises:
  a MAC Common Part Sublayer (MCPS) that generates the beacon request frame; and
  a MAC Layer Management Entity (MLME) that gathers the listing of PAN identifiers indicated by the beacon frames received from the one or more neighboring devices.

5. The method of claim 4, wherein instructing the MAC layer of the PLC device to broadcast the beacon request frame comprises issuing an MLME-SCAN.Request primitive.

6. The method of claim 4, wherein, after receiving the beacon frames, the MAC layer issues an MLME-SCAN.confirm primitive that includes the listing of PAN identifiers.

7. The method of claim 1, wherein, after attempting to join the target network using the target bootstrapping agent, the adaptation layer issues a message indicating to the host layer whether the joining was successful.

8. The method of claim 7, wherein, if the joining was not successful and there one or more other neighboring devices associated with the selected PAN identifier, the host layer selects an alternate target bootstrapping agent from the one or more other neighboring devices associated with the target PAN identifier and instructs the adaptation layer to join the target network using the alternate target bootstrapping agent.

9. The method of claim 1, wherein the target bootstrapping agent is selected based upon a highest link quality indicator value.

10. A power line communication (PLC) device comprising:
  a processor;
  communication circuitry for transmitting and receiving signals;
  a memory storing instructions executable by the processor to cause the PLC device to:
    send an active channel scan request from a host layer to an adaptation layer;
    in response to the adaptation layer receiving the active channel scan request, use the adaptation layer to instruct a media access control (MAC) layer to broadcast a beacon request frame using the communication circuitry;
    receive, using the communication circuitry, from each of one or more neighboring devices that respond to the beacon request frame, a beacon frame including an address and a personal area network (PAN) identifier;
    send a listing of PAN identifiers indicated by the beacon frames received from the one or more neighboring devices from the MAC layer to the adaptation layer;
    provide the listing of PAN identifiers from the adaptation layer to the host layer;
    use the host layer to select a target network corresponding to a selected PAN identifier and to select one of the one or more neighboring devices associated with the selected PAN identifier as a target bootstrapping agent; and
    use the host layer to instruct the adaptation layer to join the target network using the target bootstrapping agent.

11. The PLC device of claim 10, wherein the adaptation layer is a 6LoWPAN adaptation layer.

12. The PLC device of claim 10, wherein the beacon request frame is broadcasted as a one-hop broadcast.

13. The PLC device of claim 10, wherein the MAC layer comprises:
  a MAC Common Part Sublayer (MCPS) that generates the beacon request frame; and
  a MAC Layer Management Entity (MLME) that gathers the listing of PAN identifiers indicated by the beacon frames received from the one or more neighboring devices.

14. The PLC device of claim 13, wherein instructing the MAC layer to broadcast the beacon request frame comprises issuing an MLME-SCAN.Request primitive.

15. The PLC device of claim 13, wherein the MAC layer issues an MLME-SCAN.confirm primitive to the adaptation layer that includes the listing of PAN identifiers after receiving the beacon frames.

16. The PLC device of claim 10, wherein the target bootstrapping agent is selected based upon a highest link quality indicator value.

17. The PLC device of claim 10, wherein, after attempting to join the target network using the target bootstrapping agent, the adaptation layer issues a message indicating to the host layer whether the joining was successful.

18. The PLC device of claim 17, if the joining was not successful and there one or more other neighboring devices associated with the selected PAN identifier, the host layer selects an alternate target bootstrapping agent from the one or more other neighboring devices associated with the target PAN identifier and instructs the adaptation layer to join the target network using the alternate target bootstrapping agent.

19. The PLC device of claim 10, wherein, if one of the neighboring devices associated with the selected PAN identifier is a PLC data concentrator, the PLC data concentrator is selected as the target bootstrapping agent over neighboring devices that are not PLC data concentrators.

20. The PLC device of claim 10, wherein the PLC device is a G3 PLC device.

* * * * *